United States Patent
Phelan et al.

(10) Patent No.: US 6,783,474 B2
(45) Date of Patent: Aug. 31, 2004

(54) TORQUE CONTROLLER FOR CONTROLLING TORQUE TO TWO OR MORE SHAFTS

(75) Inventors: Perry E. Phelan, deceased, late of Harsens Is., MI (US), by Marjorie E. Phelan, legal representative; Joseph Palazzolo, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/034,180

(22) Filed: Dec. 28, 2001

(65) Prior Publication Data

US 2003/0125148 A1 Jul. 3, 2003

(51) Int. Cl.[7] ............................................. F16H 48/20
(52) U.S. Cl. ........................... 475/84; 475/89; 475/150; 475/231; 475/249
(58) Field of Search ............................ 475/84, 89, 150, 475/231, 249

(56) References Cited

U.S. PATENT DOCUMENTS

| | | |
|---|---|---|
| 3,799,284 A | 3/1974 | Hender |
| 4,354,144 A | 10/1982 | McCarthy .................... 318/13 |
| 4,569,251 A | 2/1986 | Greenwood ................... 74/691 |
| 4,776,235 A | 10/1988 | Gleasman et al. ......... 74/720.5 |
| 4,776,236 A | 10/1988 | Gleasman et al. ......... 74/720.5 |
| 4,805,721 A | 2/1989 | Takahashi et al. |
| 4,817,460 A | 4/1989 | Reed ........................... 74/687 |
| 4,819,507 A | 4/1989 | Pescher ................. 74/665 GA |
| 4,895,052 A | 1/1990 | Gleasman et al. ......... 74/720.5 |
| 5,168,946 A | 12/1992 | Dorgan ....................... 180/6.44 |
| 5,509,491 A | 4/1996 | Hall, III .................... 180/9.44 |
| 5,518,463 A * | 5/1996 | Shibahata et al. .......... 475/220 |
| 5,910,060 A | 6/1999 | Blume ......................... 475/28 |
| 5,989,142 A * | 11/1999 | Satzler ....................... 475/150 |
| 6,206,798 B1 | 3/2001 | Johnson ......................... 475/6 |
| 6,432,014 B2 * | 8/2002 | Fujie et al. .................... 475/84 |
| 6,520,880 B1 * | 2/2003 | Fukushima et al. ........... 475/84 |
| 6,544,136 B2 * | 4/2003 | Duan ........................... 475/88 |
| 6,544,137 B2 * | 4/2003 | Duan ........................... 475/89 |

FOREIGN PATENT DOCUMENTS

| | | |
|---|---|---|
| DE | 40 22 839 A1 | 1/1992 |
| GB | 2 090 349 A | 7/1982 |
| GB | 2 224 790 A | 5/1990 |
| JP | 11-63161 | 8/1999 |

* cited by examiner

Primary Examiner—Roger Pang
Assistant Examiner—David D. Le
(74) Attorney, Agent, or Firm—Brinks Hofer Gilson & Lione

(57) ABSTRACT

A vehicle, such as an automobile or a truck, is equipped with a mechanism to control output torque to two or more shafts. The mechanism is most usefully adapted to an axle in order to allocate torque among two or more shafts or wheels. The mechanism controls the sum and difference of torque by processing the sum and the difference independently. The mechanism converts a force, such as a torque, into quantities that can be used by the two or more shafts or wheels.

6 Claims, 8 Drawing Sheets

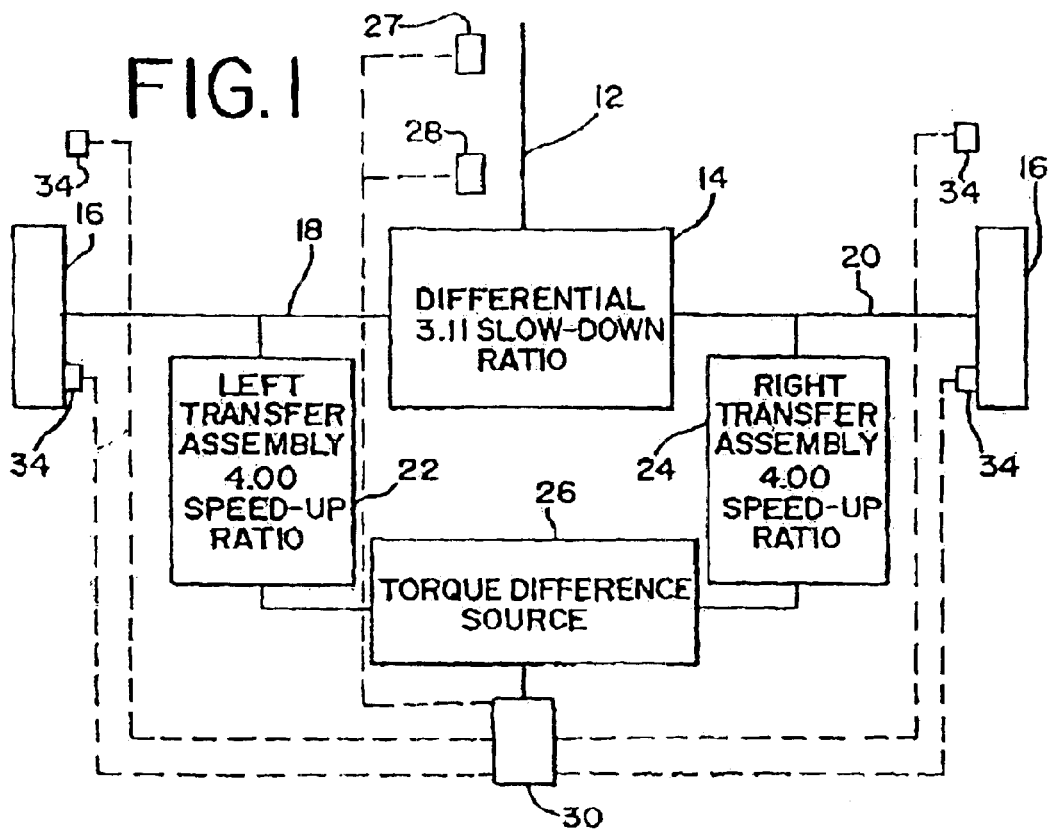
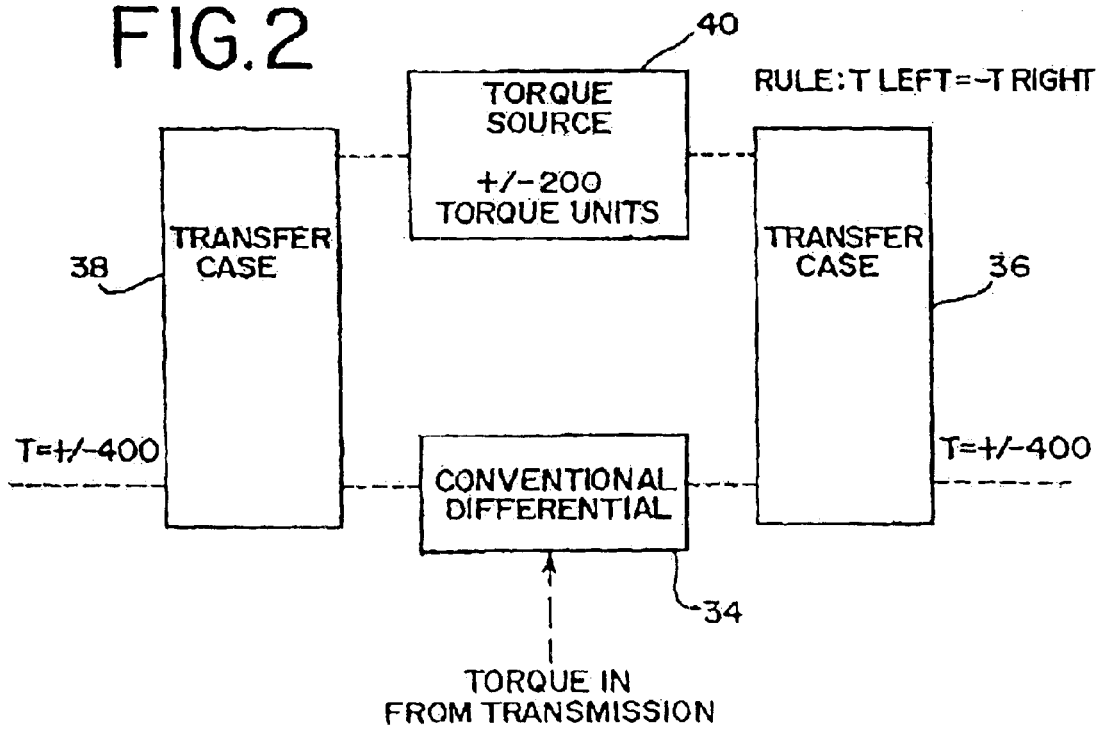

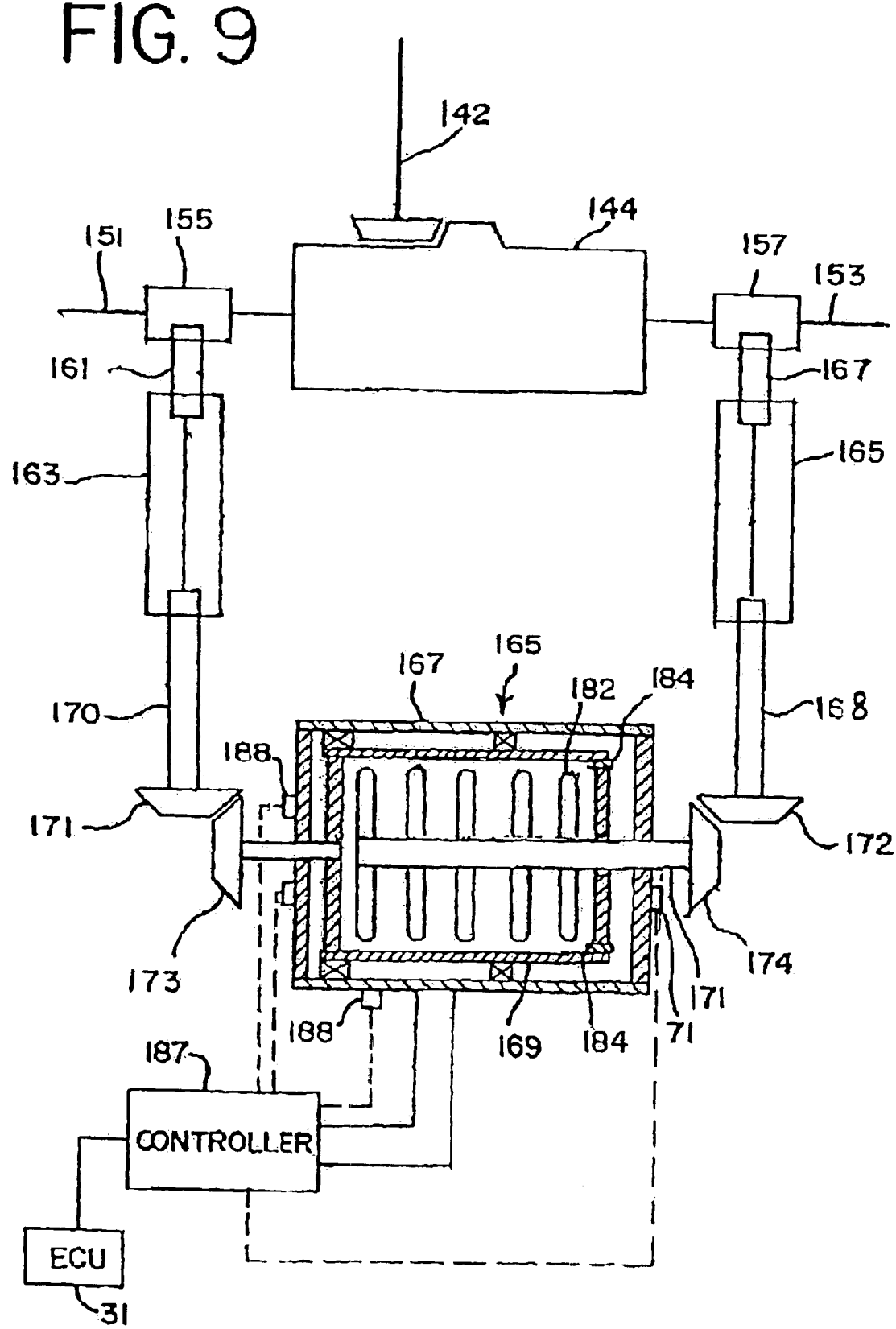

Method of Transferring Power from one side

US 6,783,474 B2

TORQUE CONTROLLER FOR CONTROLLING TORQUE TO TWO OR MORE SHAFTS

FIELD OF THE INVENTION

The present invention is directed to power transmissions, and in particular to an electromechanical transmission useful for adding or removing power to or from a shaft or a wheel.

BACKGROUND OF THE INVENTION

Automotive differentials allow two wheels mounted on output half shafts to rotate at different speeds, helping trucks and cars to remain stable in turns. However, in a conventional differential, when one wheel loses traction, the other wheel may also lose power. In a limited slip differential, when one wheel has less traction with the road than the other wheel, power is transferred from the slipping wheel to the non-slipping wheel. Under these conditions, the wheel that slips has an opportunity to recover traction, while the wheel that grips receives increased power to keep moving and perhaps to keep the vehicle moving.

Some positive limited-slip differentials are presently in the marketplace. One problem with such differentials is that they tend to be controlled by the relative speed of the wheels as well as a force or a preload applied to side gears in the differential. Another problem is that while power may be applied equally, it may be a very little amount of power to each wheel. At the same time, it seems clear that much more power is available, but is not being used. It would be useful if there were a way to allocate power among the half-shafts or axles of a vehicle, in such a way that the slipping wheel receives only the small amount of power it can use while the gripping wheel receives a greater share of power to keep the vehicle moving.

What is needed is a power or torque-allocating mechanism that would allow only a small amount of power to a slipping wheel and re-allocate power to keep the vehicle moving. What is needed is an improved power transmitter that will shift and transmit power reliably, while taking advantage of all the power that is available at a gearbox or differential. What is also needed is an improved method of allocating power between slipping and gripping wheels of an automobile or a truck.

BRIEF SUMMARY OF THE INVENTION

One aspect of the invention is a torque controller to control output power to at least two shafts. The torque controller comprises a differential having at least a first and a second shaft, each shaft having an interface to a transfer assembly. The torque controller further comprises at least a first and a second transfer assembly, the transfer assemblies connected to each interface and to the differential. The torque controller also comprises a torque difference source connected to each transfer assembly, wherein the first output shaft and transfer assembly receive work from the differential, and the second transfer assembly and output shaft receive work from at least the torque difference source.

Another aspect of the invention is a method of transferring power from a first shaft output in a differential to a second shaft output. The method comprises providing power to a differential, and sensing a difference in shaft output power application. The method then determines whether a correction in output power is needed. If a correction is needed, the method then routes power from a first shaft of the differential to a torque difference source, and routes power from the torque difference source to a second shaft output of the differential. The method then includes continuing to sense and monitor shaft outputs of the differential.

Another aspect of the invention is a torque controller to control output power to at least two shafts. The torque controller comprises a differential having at least a first and a second output shaft, the first output shaft having an interface to a first transfer assembly and the second output shaft having an interface to a second transfer assembly. The torque controller includes a torque difference source connected to the first and second transfer assemblies. The torque controller also includes means for controlling power applied by the first shaft and transfer assembly to the torque difference source and for controlling power applied by the torque difference source to the second transfer assembly and shaft.

These and many other aspects and advantages of the invention will be seen in the figures and preferred embodiments of the invention described herein.

BRIEF DESCRIPTION OF SEVERAL VIEWS OF THE DRAWINGS

FIG. 1 is a simplified diagram of the components of power transmission in an automobile or truck in accordance with the present invention.

FIG. 2 is a simplified view of control logic for improved torque regulation.

FIG. 9 is a schematic view of a pneumatic embodiment of the invention.

DETAILED DESCRIPTION OF THE PRESENTLY PREFERRED EMBODIMENTS OF THE INVENTION

Figure 3:
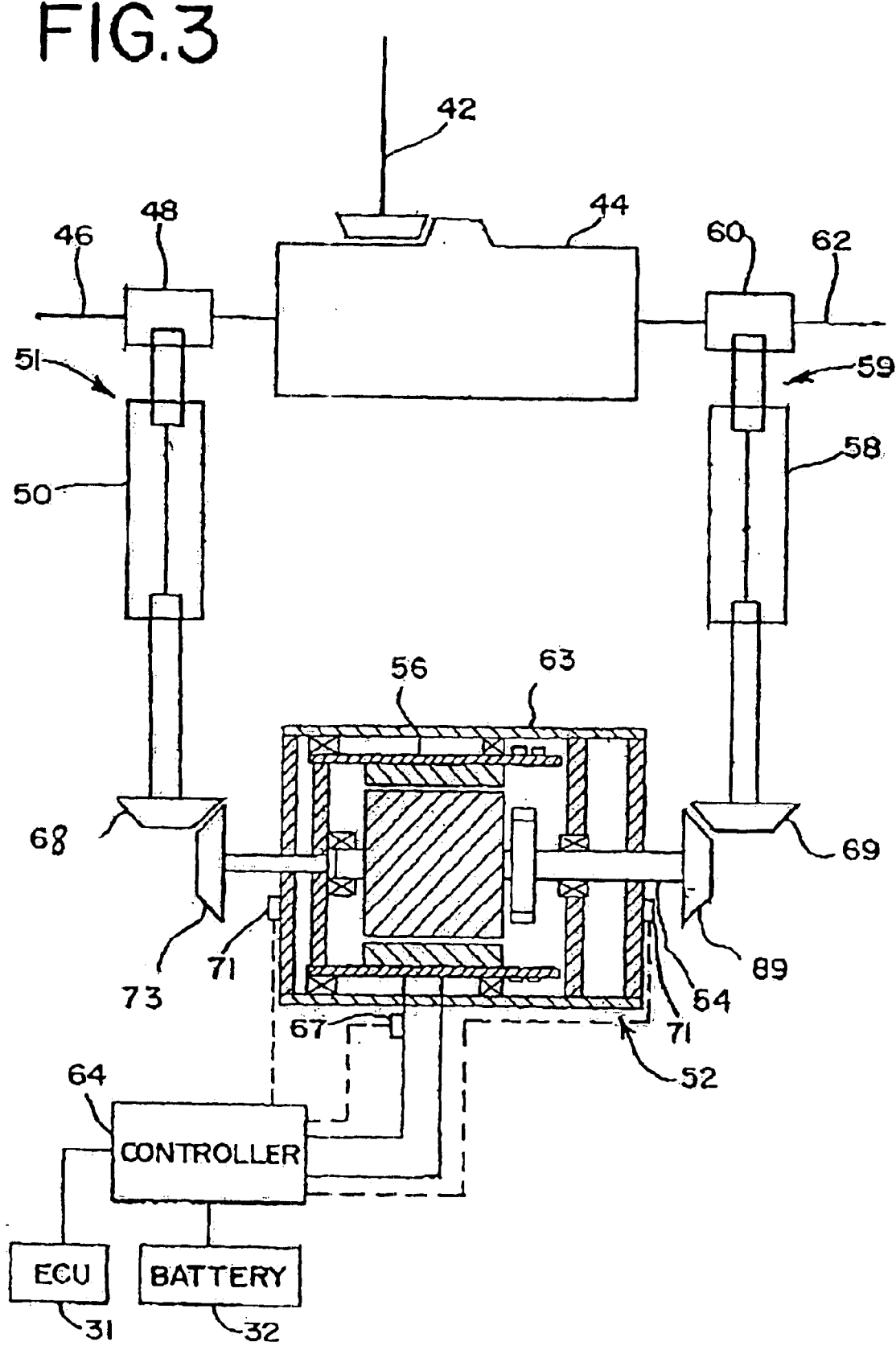
FIG. 3 is a schematic view of an electrical embodiment of a torque controller to control output torque.

FIG. 1 is a simplified diagram of the portions of an improved kinematic arrangement 10 for torque regulation in the wheels of an automobile or truck. Power from an engine and transmission (not shown) is transmitted by a drive shaft 12 to a differential 14. The differential may be a limited slip differential using cone-clutch devices, or it may be another limited slip differential which reacts to reallocate power when one wheel 16 on shaft 18 slips and the other wheel 16 on shaft 20 does not slip. In this embodiment, the arrangement includes a left transfer assembly 22 and a right transfer assembly 24, both transfer assemblies operatively connected to an output shaft 18, 20 of the differential 14. The left and right transfer assemblies are each connected so that they will transfer energy from one half-shaft or axle to a torque difference source 26. The torque difference source may be a mechanical device, such as a compressor or a hydraulic pump, or it may be an electrical device, such as a generator. The torque difference source is configured as a bi-directional motor, as an electrical motor, a hydraulic motor, or an air motor. The torque difference source is controllably connected to a controller 30. Wheel speed sensors 34, preferably from all four wheels of a car or a truck, send signals indicative of a wheel speed or axle rotational speed to controller 30. A yaw angle sensor 27 may also be located on the vehicle, preferably near the center of gravity of the vehicle, as well as a steering wheel angle sensor 28, sending signals to controller 30.

The improved kinematic torque controller works in the manner described below. When one wheel slips, perhaps the left wheel 16, the wheel and left half-axle 18 will begin to spin much faster, as the torque applied by the shaft and the wheel to the pavement lessens. A sensor, such as a wheel or axle speed sensor 34, detects the difference in speed between the left half-axle and the right half-axle. The left transfer assembly 22 then transmits power from the left half-shaft 18 to the torque difference source 26. The torque difference source transfers power to the right transfer assembly 24, which then transmits the power to the right half-axle 20. As a result, the torque on the left and right wheels is no longer equal, but instead, each wheel receives an amount of torque commensurate with the torque load it can support. The controller continues to monitor wheel speed of both wheels, to determine that enough power, but not too much power, is applied to the gripping wheel. Only useful power should be applied to the gripping wheel, not so much power as to make the wheel slip. The controller can control the amount of power by monitoring the wheel speeds and the speeds of the gear train applying power to a wheel.

In one example, the left wheel and right wheel may both transmit 50 ft-lbs. of torque equally to the road during normal operation. If the left wheel happens upon a slippery patch of ice or snow and begins to slip, it may only transfer about 10 ft-lbs of torque to the road, and if more torque tries to transfer, the wheel will simply slip more. The remaining torque is transmitted through the left transfer assembly to the torque difference source. The torque difference source may be a hydraulic pump, such as a vane pump, configured as a bi-directional motor. Other pumps may also be used, such as gerotor pumps, gear pumps, centrifugal pumps or other pumps, so long as they can be configured as a bi-directional motor. The vane pump then pumps hydraulic fluid to the right transfer assembly, where it is converted back to mechanical energy by a torque converter in the right transfer assembly. The right transfer assembly then transmits the extra torque to the right half-shaft and wheel. In an ideal situation, the extra 40 ft-lbs of torque would then be applied to the right half shaft and wheel, and the right wheel would enable the vehicle to move forward and escape the slippery portion of pavement. Note that the left and right wheels, and axles or half-shafts, do not have equal amounts of torque or energy, but rather they propel the vehicle forward for a limited time with unequal amounts of torque or energy.

The logic of the improved torque regulation is pointed out in FIG. 2, with a simplified embodiment having a differential 34, left and right transfer assemblies 36, 38, and a torque difference source 40. The principal logic used is the conservation of energy, and therefore positive torque in left equals negative torque in right. The flow of power or torque is conserved, and the torque is transferred from the left axle to the right (or vice-versa), with power or torque removed from the wheel that slips and sent automatically to the wheel maintaining good road contact. The torque difference source acts to provide negative power to the slipping wheel and shaft, and provides positive power to the gripping wheel and shaft. Negative power means that the shaft with the slipping wheel does work, or supplies power, through its transfer assembly. Positive power means that the gripping wheel has work done to it, also through its shaft and transfer assembly. By using a torque difference source, rather than connecting directly through the differential, the "positive" and "negative" aspects of power transmission are not only separated, but also may be separately controlled by the differential and by a controller 30.

FIG. 3 depicts an electrical embodiment of an automobile transmission employing a torque difference source 52 within housing 63. Automotive drive shaft 42 engages differential 44 with outputs to a left half shaft 46 and a right half shaft 62. Each half shaft is equipped with an interface 48, 60 to a transfer assembly 50, 58. In this embodiment, the interfaces 48, 56 mesh with gear trains 51, 59 in cooperation with transfer assemblies 50, 58, which may have a 4:1 speed-up in the direction from the differential to the torque difference source 52. Gear train 51 and transfer assembly 50 drive an outer rotor 56 of torque difference source 52, while gear train 59 and transfer assembly 58 drive an inner rotor 54. The torque source 52 is under the control of a power source and controller 64, which controls the amount of torque difference generated by the torque source by applying voltages to the coils of the rotors, generating a reluctance, inducing drag and thus inducing a torque difference between the inner and outer rotors.

The electrical embodiment works in the following manner, using the analogy of the left wheel slipping, although the right wheel may slip as well, and the explanation will work as well for the right side, as will be seen below. When the left wheel slips, and the left half shaft 46 speeds up. This causes interface 48, gear train 51 and transfer assembly 50 to also speed up. This increase in speed also causes the outer rotor 56, connected through shaft 73, to speed up. Sensors 34 detect the difference in wheel speeds, and the controller 64 sends a rapidly varying voltage to wound coils on the inner rotor 54. The voltage on the coils induces a reluctance field that interacts with outer rotor 56. In this example, the voltage and frequency of the excitation from controller 64 to the coils induce drag from outer rotor 56 to inner rotor 54. This drag is seen as a torque difference between the rotors and causes inner rotor 54 to speed up and outer rotor 56 to slow down. The extra shaft speed on inner rotor 54 is transferred to right transfer assembly 58, right gear train 59, right interface 60 and thence to right half shaft 62. As a result of these actions, left half-shaft 46 slows down and transfers less torque to the road, and spinning of the left wheel ceases. Right half-shaft 62 speeds up, causing more torque to transfer to the road. Thus, the torque difference source allows the shafts to better use the available torque through torque transfer. Sensors 71 monitor and report inner and outer rotor rotational speeds. They may be used to calculate torque and power transfer.

Figure 4:
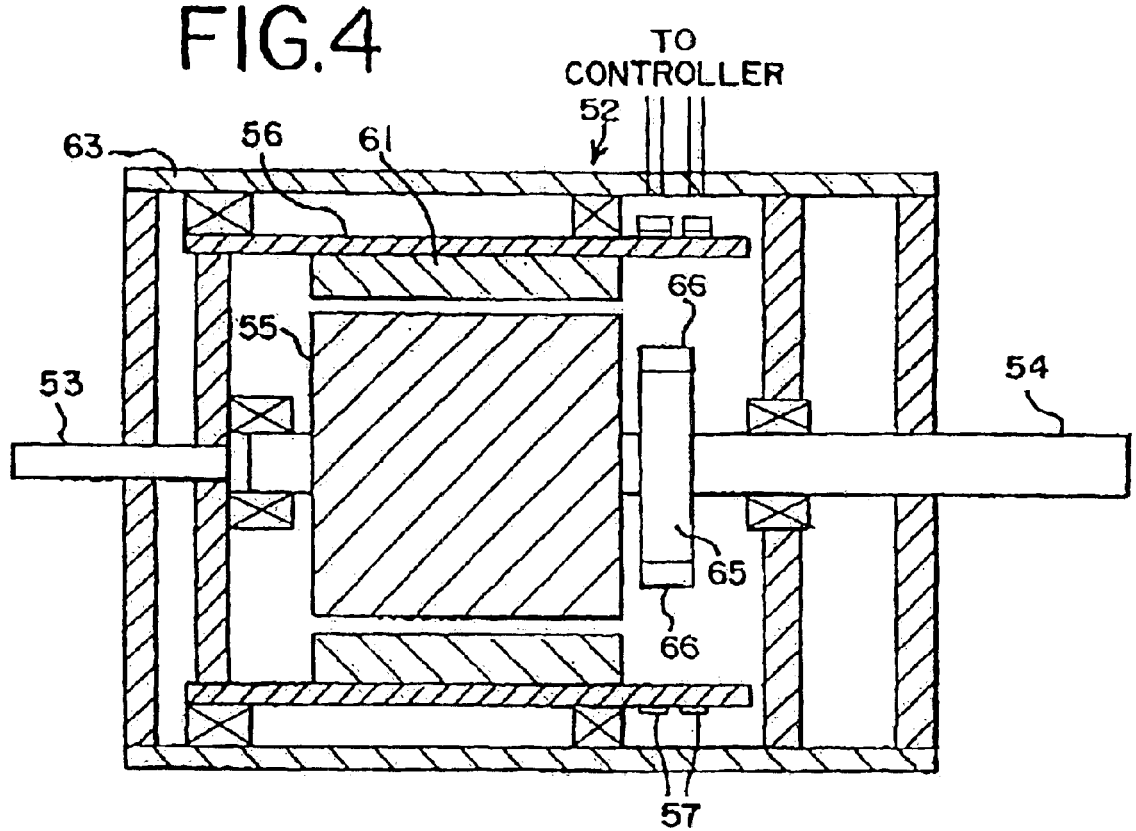
FIG. 4 is a more detailed view of the embodiment of FIG. 3.

FIG. 4 depicts internal details of one embodiment of the torque difference source 52 within housing 63. In this embodiment, outer rotor 56 is a permanent magnet rotor, having permanent magnets 61 attached to the shaft 53 of the rotor 56. Inner rotor 54 is connected as shown in FIG. 3 to the right transfer assembly 58 and gear train 59. Inner rotor 54 may be a wound rotor with coils 55. The coils receive electrical excitation from controller 64 through slip rings 57, brushes 66 and slotted commutator 65. (The connection of the slip rings to the outer power connections is not shown for clarity.) The controller sends a rapidly varying voltage to the windings 55 of the rotor, which may have as many poles as desired for rapid inducement of reluctance by the excitation voltage. Sensors 71 monitor rotor speeds and may be used by controller 64 to control the voltage applied to coils 55. Current sensors 67 may also be used to control the voltage and current to the coils. In one embodiment, the rotor is a two-pole rotor, while in other embodiments it may be a four-pole or other multi-pole rotor with the appropriate number of windings. The controller uses the voltage and frequency of excitation to the windings to control the drag between the rotors and thus the torque transferred from the one rotor to the other. Current sensors such as ammeters or current transformers may be used, as well as any convenient way to induce a voltage drop so that voltages may also be monitored where desired to control the rotation of the rotors in the desired direction, clockwise or counterclockwise.

When the automobile or truck is engaged in normal driving, there is no need to excite the windings or to induce drag in the torque difference source. If the left wheel begins to spin, the controller 64 receives signals from speed sensors 34 indicating that a slipping condition has occurred and that torque transfer is required. The controller may have the authority to command the appropriate changes, and the controller may also notify a vehicle computer or electronic control unit (ECU) before controlling a torque transfer. In addition to an ECU, other controllers on the automobile may be used, including computer, a microprocessor, a digital signal processor, an engine electronic controller, an engine control unit, a brake controller, an anti-lock brake controller, and a traction control system.

Once the controller receives the appropriate command, it calculates, from wheel speeds, wheel angle and preferably from yaw rates, the appropriate voltage and frequency to apply to the torque difference source inner rotor windings. The controller may have its own power supply or a separate power supply for generating or supplying the voltages. The controller sends voltages to the windings of the rotor, a magnetic field is generated, and drag is induced between the inner and outer rotors. If the left wheel is slipping and rotating faster, then the drag will simultaneously slow the outer rotor 56 and speed up the inner rotor 54, thus transferring torque from the left half-axle and left gear train to the right half-axle and the right gear train, as explained above.

In the case where the right wheel slips, power transfer is desired from right to left, the following sequence occurs. Controller 64 communicates with the wheel speed sensors and yaw sensors to determine that the right wheel has a significantly greater speed than the left wheel, and that the vehicle is not turning. Controller 64 determines a voltage and frequency of excitation to send to the pole windings 55 of inner rotor 54. The excitation generates a magnetic field and causes a drag on the outer rotor 56. Thus, faster-rotating inner rotor 54 slows down while slower-rotating outer rotor 56 is speeded up. The faster rotating outer rotor 56 then speeds up left gear train 51 in left transfer assembly 50, and interface 48 and left half shaft 46 speed up as a result of greater torque, while the right half shaft 62 slows down.

Figure 5:
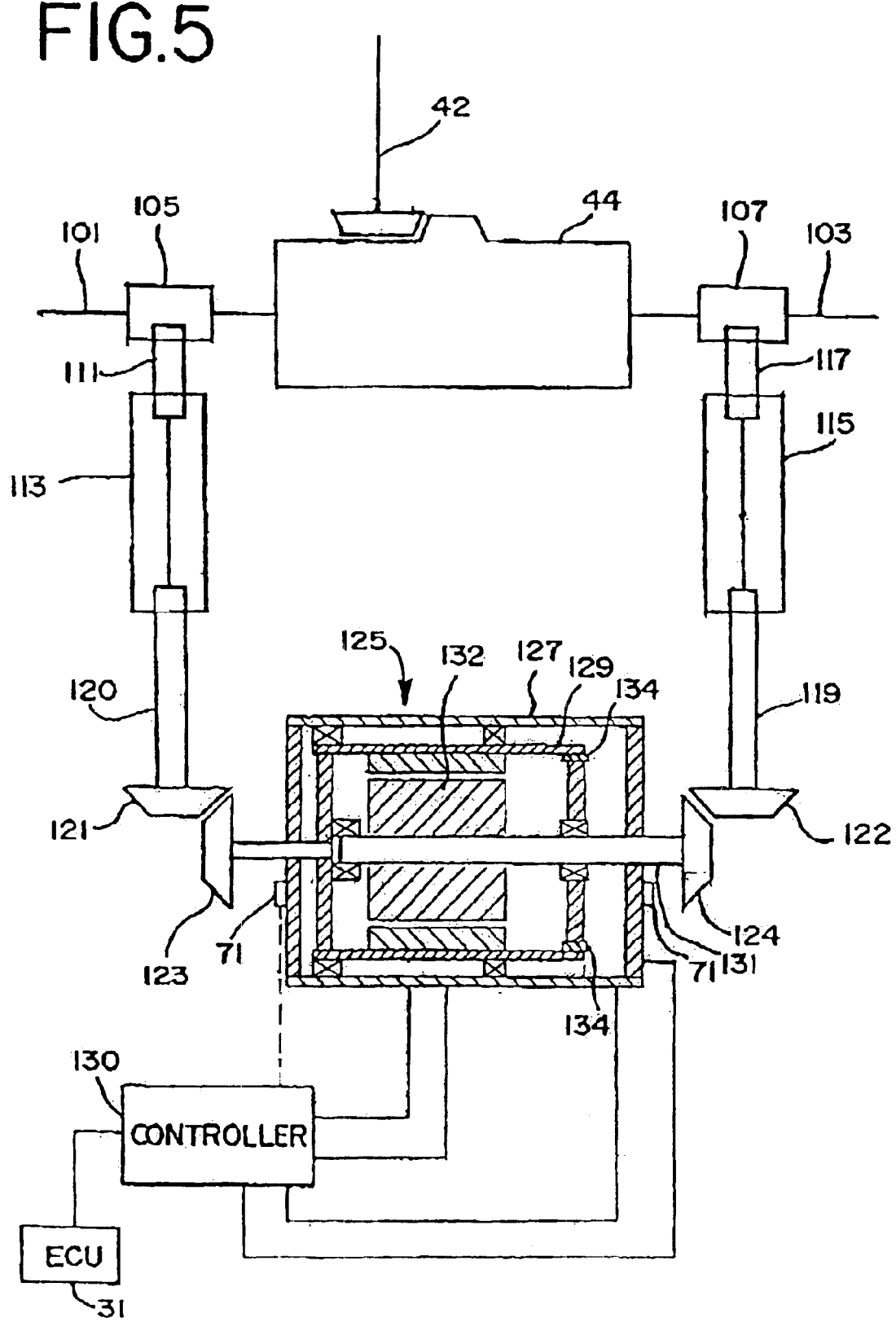
FIG. 5 is a schematic view of a hydraulic embodiment of the invention.

FIG. 5 depicts a hydraulic embodiment of the invention. An automotive transmission (not shown) drives drive shaft 42 and differential 44. The differential has output shafts 101, 103 with interfaces 105, 107 respectively. The interfaces mesh with transfer assemblies 113, 115 and gear trains 111, 117, which are speed-up gear trains in the direction from the differential to torque difference source 125. Transfer assembly 111 and gear train 113 link mechanically to the torque difference source 125 on the left side while transfer assembly 115 and gear train 117 link mechanically on the right side.

The mechanical links to the torque difference source are through left and right side gear trains. Left side transfer assembly 113 has an output shaft 120 with gear 121 meshing with gear 123 of the outer rotor 129 of the torque difference source. On the right side, transfer assembly 115 has an output shaft 119 and gear 122 meshing with gear 124 on an inner rotor 131 of the torque difference source. The torque difference source 125 in this embodiment is a hydraulic vane pump configured as a bi-directional hydraulic motor. The torque difference source includes housing 127, outer rotor 129, and inner rotor 131 with vanes 132 and oil seals 134 between the inner and outer rotors. The torque difference source generates drag between the inner and outer rotors by pumping hydraulic fluid with vanes 132. The pump may have an inlet/outlet circuit with a valve 138 for controller 130 to control pressure within the source, for instance by relieving pressure. Sensors 71 monitor inner and outer rotor speeds and may be used to calculate torque.

To illustrate the workings of this hydraulic embodiment, assume the right wheel has slipped and sensors 34 have detected an increase in the speed of the right wheel and right shaft 103. Controller 130 detects this difference in wheel speed. The increase in speed of right shaft 103 is transmitted through interface 107, gear train 117 of transfer assembly 115, shaft 119 and gears 122 and 124. In one embodiment, the gear train from 107 through 119, axle to shaft 119) is a 4:1 slow down (4:1 speed up from shaft 119 to axle). If the gear train has a different ratio of speed up or slow down, the speed difference from axle to output shaft of the transfer assembly will manifest itself as a different output speed, but will nevertheless cause an increase in speed to gear 124 and inner rotor 131.

The inner rotor will spin more rapidly and generate more friction and drag on the outer rotor 129. Controller 130 may exercise control over the friction by opening valve 138 and causing the hydraulic fluid to do work outside the differential-transfer assembly-torque difference source circuit. With outer rotor 129 now turning more rapidly, the gear train on the left in FIG. 5 speeds up, through gears 123, 121 and shaft 120. Transfer assembly 113 and gear train 111 may be a 4:1 speed up train, delivering shaft power to interface 105 and Left half shaft 101. Left half shaft 101 speeds up in proportion to the torque transferred from inner rotor 131 to outer rotor 129. The left half shaft now has increased torque to transfer to the left wheel and keep the vehicle moving. In this embodiment, the torque difference source removed torque from spinning right half shaft 103 and transferred it to gripping left half shaft 101. The torque on the shafts is not equal, and the left half shaft now has the torque to power the vehicle until it gets back to a steady grip for both wheels.

Figure 6:
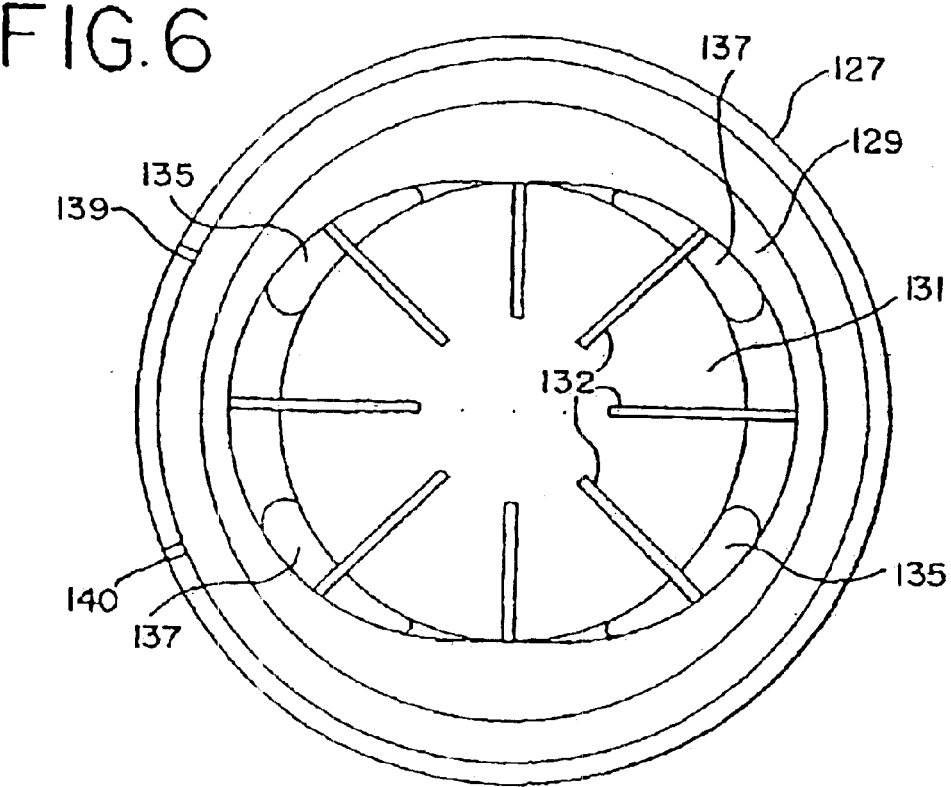
FIGS. 6–8 are more detailed views of the embodiment of FIG. 5.
Figure 7:
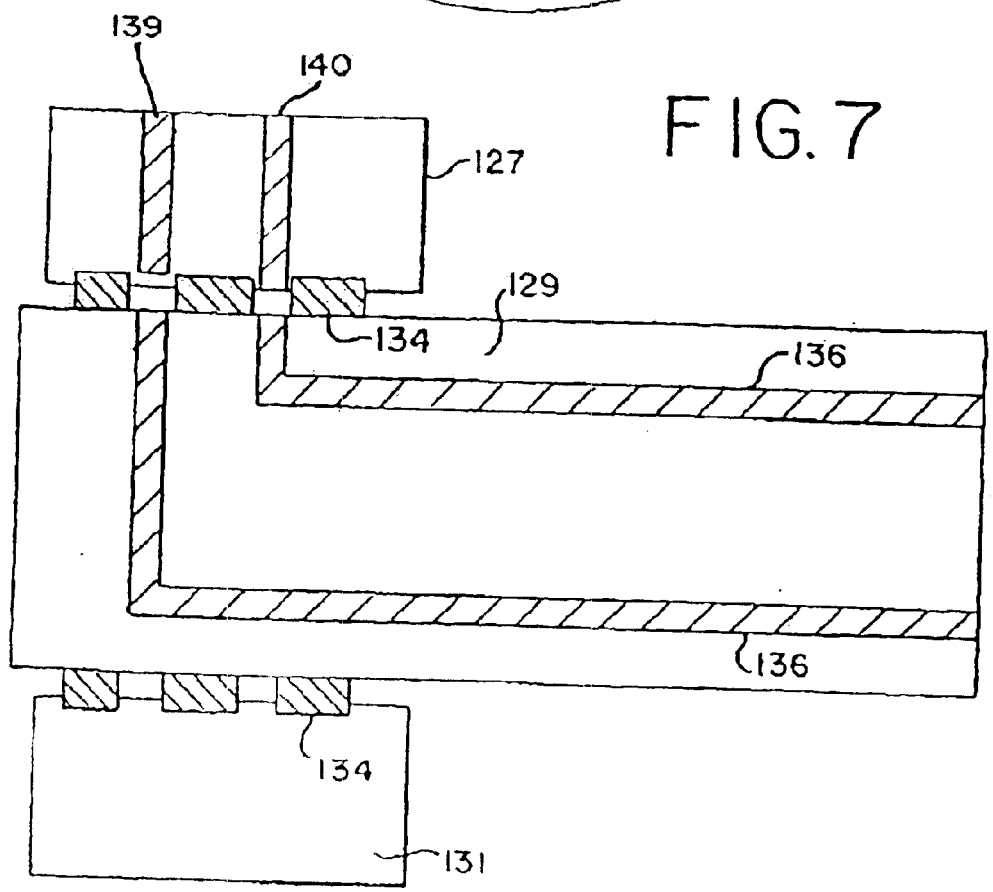
Figure 8:
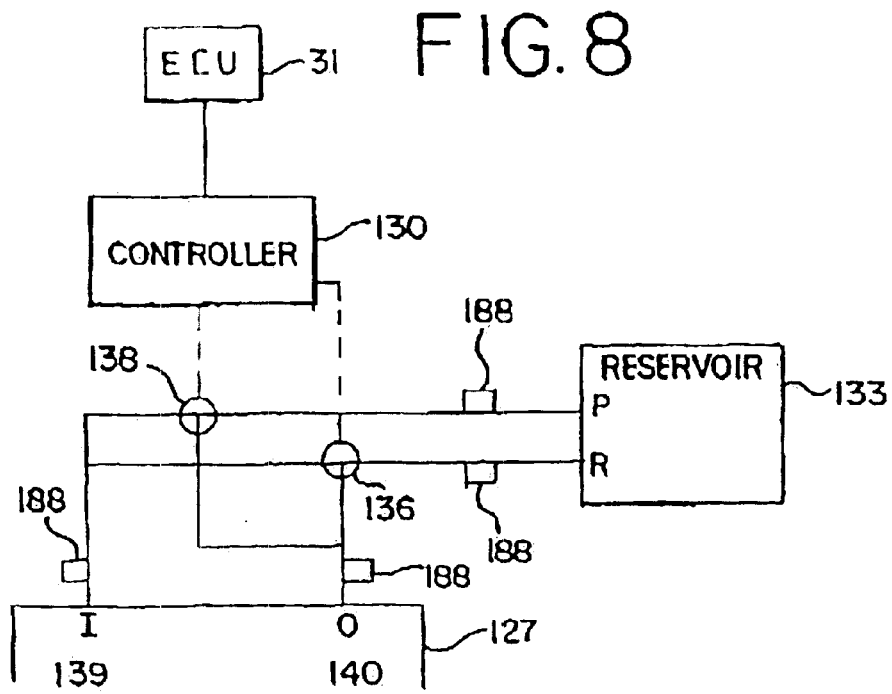

FIGS. 6–8 depict details of the inner and outer rotors of the hydraulic bi-directional motor used in FIG. 5. FIG. 6 is a cross sectional view of the torque difference source 125 of FIG. 5. The housing 127 surrounds the outer rotor 129 and inner rotor 131. Vanes are attached to the inner rotor 131. Inner rotor 131 may be ovate or eccentrically shaped, as shown, so that vanes 132 slide in and out as the rotor rotates. Inlet 139 is connected to ports 135 and outlet 140 is connected to ports 137. The inlet ports are located at 180° to each other and at 90° to the outlet ports. The outlet ports are also located at 180° to each other. The ports may be located in port plates at the axial ends of the motor. The drag of the vanes creates a torque opposite the direction of rotation of the inner rotor 131. The hydraulic fluid within the pump transfers the torque to the outer rotor 129.

FIG. 7 details the seals 134 between the inner rotor 131 and the outer rotor 129, allowing for rotation of both the inner and outer rotors within housing 127. Oil passages 136 lead to inlet 139 and outlet 140. FIG. 8 is a schematic representation of the control system for the hydraulic embodiment. Hydraulic controller 130 is in communication vehicle controller 31, which may be an engine control unit (ECU) or other computer or microprocessor computer. The controller controls two 3-way PWM-controlled solenoid valves 136, 138, which control the flow of hydraulic fluid from a reservoir 133 to the torque difference source. The controller controls the direction of flow of pressurized fluid for either clock-wise or counter-clockwise application to the hydraulic motor. In one example, for counterclockwise flow, valve 138 receives pressurized fluid from reservoir 133 and routes it to inlet 139. Valve 136 then routes the return flow from outlet 140 to the return line of the reservoir 133. For clockwise application, the valve positions are reversed. The controller can control the pressure and flow by rapidly opening and closing the valves to achieve the desired effect. Pressure sensors 188 assist the controller in controlling the valves. While pressure sensors are preferred, flow sensors may also be used to control the valves FIG. 9 depicts a pneumatic embodiment, in which the torque difference is provided by a pneumatic compressor configured as a bi-directional air motor. A drive shaft 142 drives a differential 144 having output shafts 151 and 153. The output shafts have interfaces 155 and 157. On the left side, transfer assembly 163 includes 4:1 speed-up gear train 161 and output shaft 170. Shaft 170 ends in gear 171, meshing with gear 173 for outer rotor 169 of torque difference source 165. On the right side of FIG. 8, transfer assembly 165 includes 4:1 speed-up gear train 167 and output shaft 168. Shaft 168 ends in gear 172, meshing with gear 174 for inner rotor 171 of the torque difference source 165.

Torque difference source 165 is a 5-stage axial compressor, as mentioned above, configured as a bi-directional air motor, housed in housing 167, including inner rotor 171 with five stages 182 as shown, and an outer rotor 169. Seals 184 allow rotation of the inner and outer rotors without loss of air. Controller 187 may receive inputs from sensors located about torque difference source 165, including pressure sensors 188 for measuring pressure at points around the motor, and sensors 71 for measuring rotational speeds of the inner and outer rotors. The rotational speeds of the rotors may be used for calculating torques.

The operation of the pneumatic torque difference source is similar to the electrical and hydraulic versions. During rotation, drag is transferred between the rotors. Whether the inner rotor or the outer rotor speeds up, the increase in speed will be manifest as an increase in drag, and torque will be transferred from the rotor that speeds up to the other rotor. The increased speed from the wheel that slips will be transformed by the gear trains, the interfaces, and the torque difference source into added torque on the wheel that grips. While FIG. 9 depicts a centrifugal compressor used as a motor, other compressors may also be used. These include axial compressors, vane compressors, rotary compressors, and screw-type compressors. Still other compressors may be also be used, so long as they can be configured for use as a bi-directional pneumatic motor.

Figure 10:
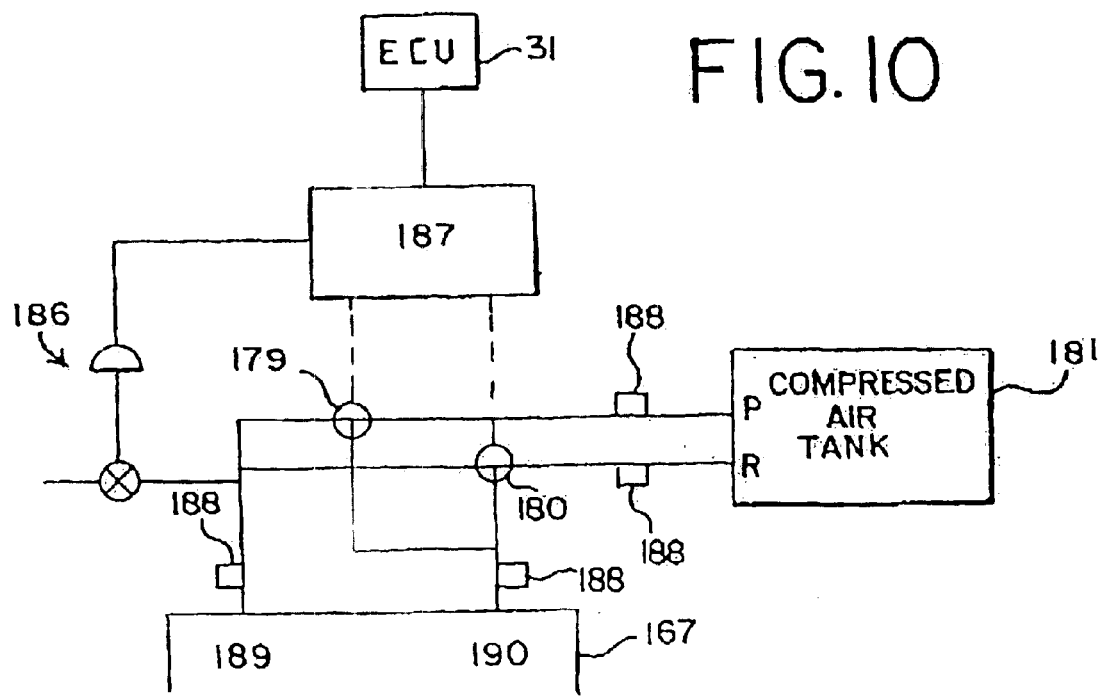
FIG. 10 is a more detailed view of the embodiment of FIG. 9.

FIG. 10 depicts a schematic representation of the control system for the pneumatic embodiment. Pneumatic controller 187 is in communication vehicle controller 31, which may be an engine control unit (ECU) or other computer or microprocessor computer. The controller controls two 3-way PWM-controlled solenoid valves 136, 138, which control the flow of compressed air from a tank 181 to the torque difference source. The controller controls the direction of flow of pressurized air for either clock-wise or counter-clockwise application to the hydraulic vane pump. In one example, for clockwise flow, valve 179 receives pressurized air from tank 181 and routes it to inlet 189. Valve 180 then routes the return flow from outlet 190 to the return line of the tank 181. For counter-clockwise application, the valve positions are reversed. The controller can control the pressure and flow by rapidly opening and closing the valves to achieve the desired effect. Pressure sensors 188 assist the controller in controlling the valves. While pressure sensors are preferred, flow sensors may also be used to control the valves. The pneumatic version may also have a valve 186 under the control of controller 187 on a loop for bleeding pressure when desired.

Figure 11:
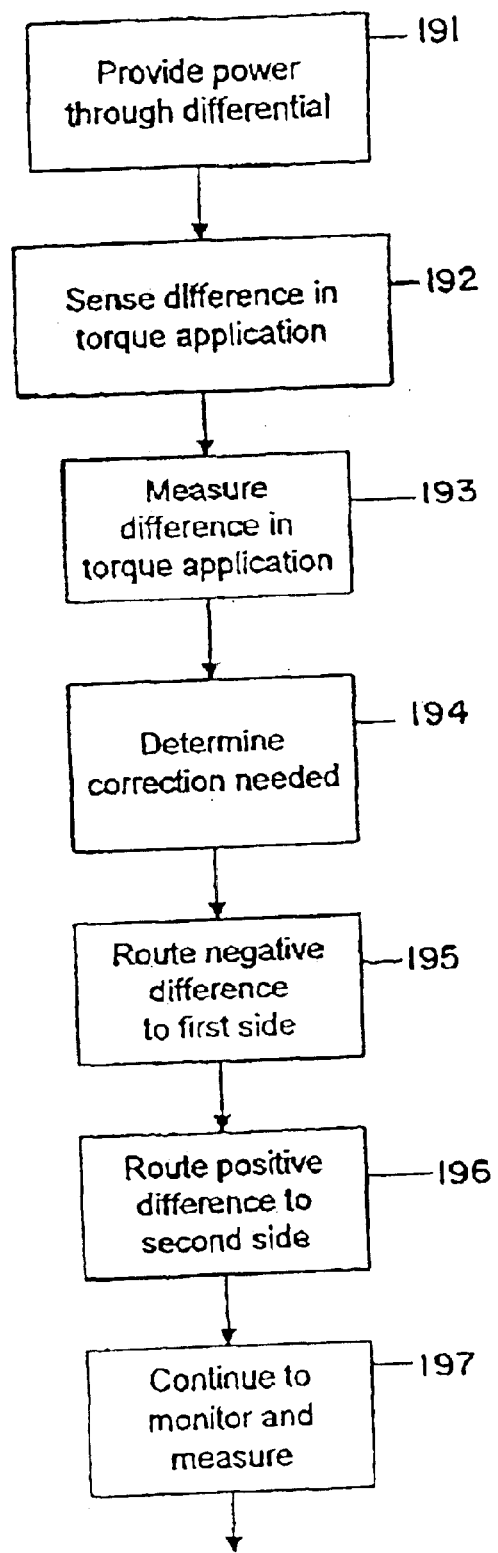
FIG. 11 is a flowchart for a method of regulating torque.

FIG. 11 depicts a flowchart for a method of transferring power from one shaft to another. In a first step 191, power is provided to a differential. The differential need not be an automotive differential, but may be any mechanical device having an input and more than one outputs. Besides an automotive differential, other devices may include stationary mechanical power and power transmission devices. A difference is sensed 192 in the torque application of the outputs of the differential. The difference in application of the power or torque is then measured 193 to determine whether a correction is needed 194. The method then applies a negative torque or power difference to a first side 195, that is, the method causes the side applying less power to do work. The method then takes that work or torque and applies it to another side or another output 196, such as another shaft. The method then continues to monitor and measure 197 the outputs to determine whether further corrections are necessary or whether differential or other device for distributing power can return to normal operation. In both the electrical and mechanical embodiments, the application of power is independent of the source of power and is under the control of at least one controller.

There are many ways to practice this invention. While the embodiments described have focused on automotive and truck applications with two output shafts, other applications and devices with more than two output shafts may use the present invention. While various controllers and sensors have been depicted in the various embodiments, useful sensors for controlling the distribution of torque among two or more shafts may include wheel speed sensors, shaft speed sensors, flow sensors, pressure sensors, ammeters, voltage sensors, steering angle sensors and yaw rate sensors.

It is therefore intended that the foregoing description illustrates rather than limits this invention, and that it is the following claims, including all equivalents, which define this invention. Of course, it should be understood that a wide range of changes and modifications may be made to the embodiments and preferences described above. Accordingly, it is the intention of the applicants to protect all variations and modifications within the valid scope of the present invention. It is intended that the invention be defined by the following claims, including all of the equivalents thereto.

What is claimed is:

1. A torque controller adapted to control comprising:
   a differential having first and second output shafts extending therefrom, each of said first end second output shafts having an interface mounted thereon;
   a first transfer assembly and a second transfer assembly, said first transfer assembly engaging said interface of said first output shaft and said second transfer assembly engaging said interface of said second output shift such that rotational motion is transferred and redirected between said first output shaft and said first transfer assembly and said second output shaft and said second transfer assembly;

said transfer assemblies each including a gear train adapted to change the ratio of speed between said transfer assembly and said output shafts to either speed up or slow down the rotation transferred therebetween;

a torque difference source positioned between and interconnection said first and second transfer assemblies, said torque difference source including an inner rotor, an outer rotor, and a plurality of vanes positioned therebetween, said outer rotor engaging said first transfer assembly such that rotational motion is transferred between said first output shaft and said outer rotor through said first transfer assembly, said inner rotor engaging said second transfer assembly such that rotational motion is transferred between said second output shaft and said inner rotor through said second transfer assembly, a power source adapted to pump hydraulic fluid between said inner and outer rotors, thereby inducing drag between said inner and outer rotors;

at least two sensors, said sensors being adapted to measure the difference in rotational speed of said first and second output shafts and thereby the relative power output of said first and second output shafts; and an electronic controller adapted to receive a signal from said sensors and to selectively actuate said power source to provide hydraulic fluid between said inner and outer rotors.

2. The torque controller of claim 1, wherein the amount of work from said second transfer assembly and said second output shaft is greater than the amount of work from said first transfer assembly.

3. The torque controller of claim 1, further comprising means for monitoring power applied by said first output shaft and said first transfer assembly to said torque difference source and by said torque difference source to said second transfer assembly and said second output shaft.

4. The torque controller of claim 1, wherein the means for monitoring power are selected from the group consisting of a computer a microprocessor, a digital signal processor, an engine electronic controller, an engine control unit, a brake controller, an anti-lock brake controller, and a traction control system.

5. The torque controller of claim 1 wherein said sensors are positioned to directly measure the rotational speed of said first and second output shafts.

6. The torque controller of claim 1 wherein said sensors are positioned to measure the rotational speeds of said inner and outer rotors, said controller being adapted to calculate the relative rotational speeds of said output shafts from the rotational speeds of said inner and outer rotors.

* * * * *

UNITED STATES PATENT AND TRADEMARK OFFICE
CERTIFICATE OF CORRECTION

PATENT NO. : 6,783,474 B2
DATED : August 31, 2004
INVENTOR(S) : Perry E. Phelan et al.

It is certified that error appears in the above-identified patent and that said Letters Patent is hereby corrected as shown below:

Column 10,
Line 3, after "a computer" insert -- , -- (comma).

Signed and Sealed this

Fifth Day of April, 2005

JON W. DUDAS
*Director of the United States Patent and Trademark Office*